Jan. 1, 1935. J. P. SPANG 1,986,073
MACHINE FOR SLITTING MEAT
Filed Jan. 6, 1932 2 Sheets-Sheet 2
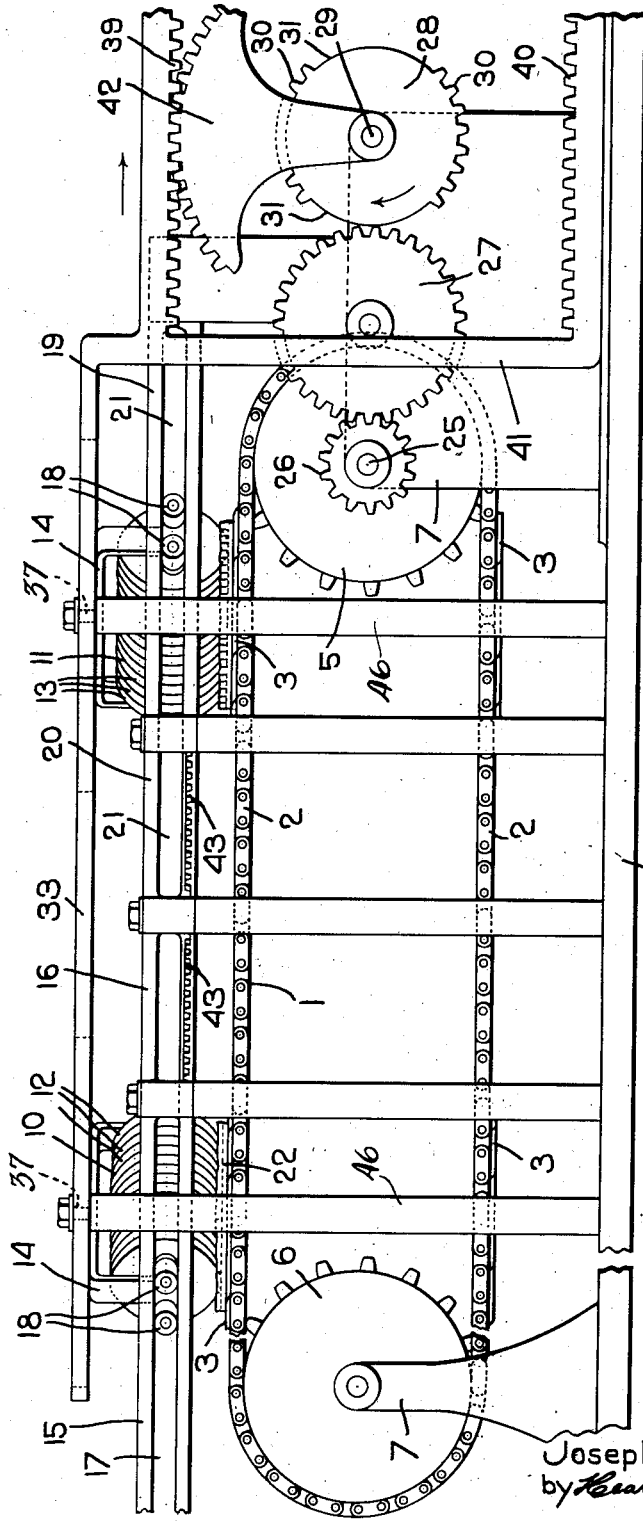
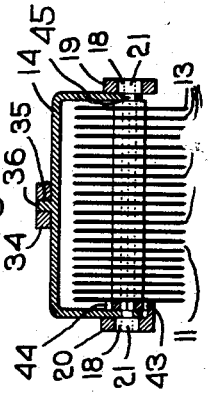
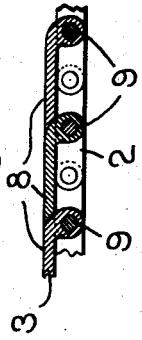
Inventor.
Joseph P. Spang
by Heard Smith & Tennant.
Attys.

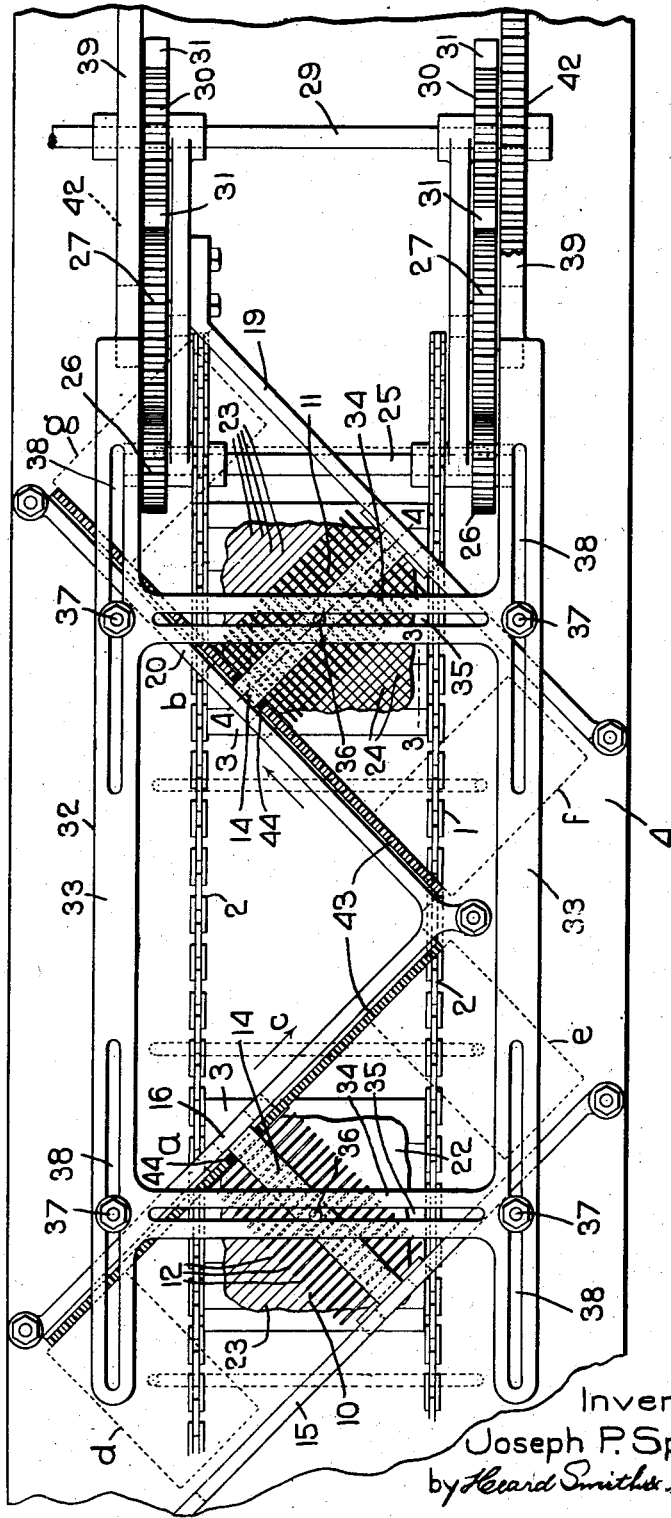

Patented Jan. 1, 1935

1,986,073

UNITED STATES PATENT OFFICE 1,986,073

MACHINE FOR SLITTING MEAT

Joseph P. Spang, Quincy, Mass.

Application January 6, 1932, Serial No. 585,068

17 Claims. (Cl. 17—27)

This invention relates to machines for slitting slices of steak and other meat for the purpose of increasing the cooking surface and it relates particularly to that type of machine which is constructed to cut in the meat two series of slits which cross each other.

One of the objects of the invention is to provide a novel machine of this type which is arranged so that the meat will be fed continuously in the same direction and the two series of crossing slits will be cut in the meat during the forward feed thereof.

In the present embodiment the meat is fed forward with a step by step movement and after one forward step a series of slits are cut through the meat in one direction and after a subsequent forward step a second series of slits are cut in the meat in a different direction so that the second series of slits will cross those of the first series.

In order to give an understanding of the invention I have illustrated in the drawings a selected embodiment thereof which will now be described after which the novel features will be pointed out in the appended claims.

Fig. 1 is a top plan view of a meat-slitting machine embodying my invention;

Fig. 2 is a side view thereof;

Fig. 3 is a section on the line 3—3, Fig. 1;

Fig. 4 is a section on the line 4—4, Fig. 1.

The device herein shown comprises an endless feed apron or conveyer for feeding the slices of meat forward with a step by step movement and two sets or gangs of slitting knives arranged to act on the meat between the forward feeding movements thereof, one set or gang of knives operating to cut in the meat a series of slits extending continuously across the slice in one direction and the other set or gang of knives operating to cut in the meat a second series of slits which cross or extend at an angle to the slits of the first series and also extending continuously across the slice.

In the drawings 1 indicates an endless conveyer by which the meat 22 to be slit is fed forward and this is shown as comprising two sprocket chains 2 which carry platforms 3 on which the meat 22 to be sliced is supported. These sprocket chains are shown as passing around sprocket wheels 5 and 6 which are supported in suitable bearings 7 carried by the frame 4 of the machine.

The platforms 3 are herein shown as sectional so as to permit them to readily pass around the sprocket wheels 5 and 6. As shown in Fig. 3 each platform comprises a series of platform sections 8 which are carried by rods 9 extending from one sprocket chain to the other. When the portions of the sprocket chains carrying the platforms are straight as shown in Figs. 1 and 3 the sections of the platform will be in the same plane, thus making a proper support for the meat but the sectional character of the platform makes an articulated platform which permits it to pass around the sprocket wheels. Suitable means presently to be described are provided to give the conveyer a step by step or intermittent forward movement by which the platforms 3 are advanced from one station to another, with a period of rest at each station. The slitting of the meat occurs while the platforms are at rest.

Slitting knives of any appropriate character for slitting the meat may be used. I have herein shown rotary knives but the invention is not necessarily limited to the use of rotary knives for this purpose. There are two gangs or sets of knives illustrated and these are indicated generally at 10 and 11. Each set of knives consists of a plurality of disk knives which are rigidly mounted on a shaft. The knives of the set 10 are designated 12 and those of the set 11 are designated 13. Each set of knives is carried by a shaft 45 and the knives of each set are held properly spaced from each other by spacers. These sets or gangs of knives are mounted so that they move diagonally of the direction of movement of the meat and are rotated as they move, each set of knives having its movement between the forward steps of the meat or while the platforms are at rest.

As herein shown the shaft 45 of each set of knives is mounted in a yoke member 14 and the latter is mounted in a suitable guiding frame for movement diagonally of the direction of movement of the conveyer.

The guiding frame for the gang or set 10 of knives comprises two guiding members 15, 16 in the form of bars which are situated above and extend diagonally of the conveyer 2, each guiding bar having a slot 17 therein in which is received guiding rolls 18 carried by the ends of the yoke 14. The guiding frame for the gang 11 of knives is of a similar nature, it comprising two guiding members 19 and 20 which are supported above the conveyer 2 and are also arranged diagonally thereof, each guiding member 19 and 20 having a guiding slot 21 in which is received rolls 18 carried by the yoke 14 of the gang 11 of knives.

Means are provided for rotating the knives as they are given their meat-slitting movements. For this purpose the shaft 45 of each gang of knives has a gear 44 fast thereon which meshes with a rack 43 rigid with one of the guiding bars. In the construction shown these racks 43 are rigid with the guiding members 16 and 20.

With this arrangement the movement of the gang of knives longitudinally of the guiding means causes the knives to rotate and since the gears 44 are smaller than the knives said knives will operate on the meat with a shearing or draw cut.

It will be remembered that the conveyer 2 is operated intermittently so that the platforms 3 are advanced with a step by step motion from one station to another, the platforms remaining at rest at the various stations. During the period of rest at one station the gang of knives 10 is given a forward movement causing it to cut a series of slits in the meat on the platform at said station in a diagonal direction, and at the end of a subsequent forward movement when the meat has been brought to a subsequent station the gang of knives 11 is given a movement across the meat, thereby cutting slits in the meat which cross or are at an angle to the slits cut by the knives of the gang or set 10. This is illustrated in Fig. 1 wherein 22 indicates a piece of meat on one platform 3 and situated at one of the stations, which for convenience will be referred to as station $a$. Fig. 1 shows the gang 10 of knives moving across the meat 22 in the direction of the arrow $c$ and cutting slits 23 therein. In thus making the slits the gang 10 of knives moves from the dotted line position $d$ to the dotted line position $e$. After the slits 23 have been cut the conveyer 2 is given another step forward by which the meat is carried to the next station, which will be indicated as station $b$; and while the meat is at station $b$ the knives 11 are moved across the meat diagonally so as to cut a second series of slits therein indicated at 24, the slits 24 crossing the slits 23. In making the slits 24 the knives 11 move between the dotted-line positions indicated at $f$ and $g$.

Suitable means is provided for giving the conveyer 2 its intermittent or step by step movement by which the pieces of meat are advanced from one station to the other and for giving the knives 10 and 11 their operative movement during the time that the meat is at rest at the stations.

The means for operating the conveyer with the step by step movement is herein shown as a drive connection employing intermittent gearing. The sprocket wheels 5 are shown as carried by a shaft 25 which has a gear 26 thereon meshing with an intermediate gear 27 that is mounted on the frame 4. This gear 27 is driven intermittently through an intermittent gear 28 carried by a shaft 29. The gear 28 is an interrupted gear, it having two sets of gear teeth 30 on its periphery, the sets being separated by plain sections 31.

The periphery of the gear 28 is divided into quarters and two opposed quarter sections are provided with the gear teeth 30 and the other two quarter sections are plain as shown at 31. The gear 28 is a driven gear and hence at each rotation thereof the gear 27 will be given two steps forward, one step occurring each time that a set of gear teeth 30 come into mesh with the gear 27. Between each forward step or when either of the sections 31 of the gear 28 is opposite the gear 27 the latter will remain at rest. This mechanism will thus give the conveyer 1 an intermittent forward motion with a pause between each forward step.

The means for operating the knives 10 and 11 consists of a reciprocating knife-actuating member 32 which comprises the two side bars 33 connected by cross bars 34. These cross bars 34 are slotted as shown at 35 and the yokes 14 for the two sets of knives are provided with pins 36 which operate in the slots 35. The knife-actuating member 32 is given a reciprocating movement in the direction of the feeding movement of the conveyer 1 and during such movement the action of the slotted cross bars 34 on the pins 36 will cause the knives 10 and 11 to move in the direction of the length of the knife-guiding members 15, 16 and 19, 20, and engagement of the gears 44 with the racks 43 will cause the knives to rotate as they are thus moved lengthwise of the knife-guiding members.

The knife-actuating member 32 is shown as guided in its movement by guiding pins 37 which operate in slots 38 formed in the side bars 33, said pins 37 being suitably mounted on posts 46 forming part of the frame 4. The reciprocating of the frame 32 in timed relation with the step by step movement of the conveyer 1 is provided for as follows. Said frame 32 has rigid therewith two racks 39 and 40, the rack 40 being carried by a depending portion 41 of the member 32. The shaft 29 has fast thereon a segmental gear 42 which is adapted to mesh with these racks 39 and 40 alternately. During a part of each rotation of the shaft 29 the segmental gear 40 will be meshing with the rack bar 39 thereby moving the knife actuator 32 to the right as indicated in Fig. 2; and during another portion of said rotation the segmental gear will be meshing with the rack 40, thereby moving the actuator 32 to the left.

The segmental gear 42 is so positioned on the shaft 29 relative to the gear 28 that said segmental gear is in mesh with the racks 39 and 40 during the times that the gear 28 is disconnected from the gear 27, in other words, during the times that the plain portions 31 of the gear 28 are adjacent the teeth of the gear 27. Furthermore, during the time that the gear teeth 30 are meshing with the gear 27 the segmental gear 42 will be out of mesh with either of the racks 39 and 40. Hence with this arrangement the actuator 32 will be given its movement either forwardly or backwardly while the gear 27 and the conveyer 1 are at rest and the conveyer will be stepped forward while the frame 32 is at rest.

Assuming that the segmental gear 42 is in mesh with the rack 39 as shown in Fig. 2 and that slices of meat 22 are on the platforms at stations $a$ and $b$, it will be seen that during one portion of the rotation of the shaft 29 the actuator 32 will be moved toward the right thereby moving the knife gangs 10 and 11 from the left hand to the right hand dotted line position. During this movement of the knives the gang of knives 10 will cut slits 23 diagonally through the slice of meat 22 at station $a$ while the gang of knives 11 will cut slits 24 diagonally through the slice of meat at station $b$.

As soon as the segmental gear 42 passes out of mesh with the rack 39 then one set of the teeth 30 of the gear 28 will pick up the gear 27 and said gear 27 will be given a forward movement thereby to step the conveyer 1 forward, which will carry the meat 22 which was at station $a$ into a position at station $b$ and will carry the meat which was at station $b$ forward to a position where it is delivered from the conveyer. The same movement will also bring a fresh uncut slice of meat into position at station a. At the end of the forward movement of the conveyer the segmental gear 42 meshes with the rack 40 and causes a return movement of the actuator 32, which will cause the two gangs of knives 10 and 11 to be moved from the left hand dotted line position to the right hand dotted line position during which return movement the knives 10 will cut slits in the slice of meat at station a which extend in the direction of the slits 23 in Fig. 1 while the knives 11 will cut slits in the meat at station b which are parallel to the slits 24.

When the segmental gear 42 has passed out of mesh with the rack 40 but before it engages the rack 39 then the platform will be given another step forward as above indicated, thereby bringing another fresh uncut piece of meat at station a and carrying the piece of meat which has a single series of slits cut therein from station a to station b and at the same time delivering from station b the slice of meat which has had both series of slits cut therein.

The operation of the machine, therefore, involves simply placing uncut pieces of meat on the platforms 3 at the receiving end of the conveyer before said platforms reach station a and while each piece of meat is at rest at station a it will have the slits 23 cut therein by the knives 10 and at the same time the slice of meat which has been just advanced from station a to station b will have the slits 24 cut therein. Each piece of meat is thus acted on by the two gangs of knives successively. Furthermore, in their operation each gang of knives moves diagonally toward the right for operation on one slice of meat and then retraces its path and moves diagonally toward the left for operation on the next succeeding piece of meat.

I claim:

1. In a machine for slitting meat, the combination with means for feeding meat forward, of means moving diagonally across the meat for making continuous straight slits in the meat in a direction at an angle to the direction of feed.

2. In a meat-slitting machine, the combination with means for feeding meat forward, of means for making two series of parallel slits in the meat, the slits of each series extending continuously across the meat in a direction at an angle to the slits of the other series and also at an angle to the direction of feed.

3. In a meat-slitting machine, the combination with means for feeding meat forward, of means for making two series of parallel straight slits in the meat, the slits of each series extending continuously across the meat in a direction at right angles to the slits of the other series and at an acute angle to the direction of feed.

4. In a meat-slitting machine, the combination with means to feed a slice of meat forward with a step-by-step movement, of means to make a series of slits in the meat extending from one side to the other of the slice and at an angle to the direction of feed while the meat is at rest at one point in its feeding movement and to make a second series of slits also extending from one side to the other of the slice and at an angle to the direction of feed as well as at an angle to the first-named slits while the meat is at rest at another point in its feeding movement.

5. In a meat-slitting machine, the combination with a conveyer for supporting a slice of meat to be slit, of means for moving said conveyer with a step-by-step motion to carry the meat supported thereon from station to station, and means to make a series of slits in the meat extending from one to another edge of the slice while it is stationary at one of the stations.

6. In a meat-slitting machine, the combination with a conveyer for supporting meat to be slit, of means for moving said conveyer with a step-by-step motion to carry the meat supported thereon from station to station, means to make a series of slits in the meat which extend continuously across the meat at an angle to the line of feed while said meat is at rest at one of the stations.

7. In a meat-slitting machine, the combination with means for feeding meat forward, of means for making two series of parallel slits in the meat with the slits of each series extending continuously across the meat in a direction at an angle to the direction of feed and also in a direction at an angle to the slits of the other series.

8. In a machine for slitting meat, the combination with means for feeding meat forward, of means for making two series of parallel straight slits in the meat, the slits of each series extending continuously across the meat in a direction at right angles to the slits of the other series and also at an angle to the direction of feeding movement of the meat.

9. In a machine for slitting meat, the combination with means for feeding meat forward with a step-by-step movement, of means to make a series of slits in the meat extending continuously across the meat while the meat is at rest between two forward steps at one point in its feeding movement, and to make a second series of slits in the meat also extending continuously across the meat at an angle to the slits of the first series when the meat is at rest between two forward steps at another point in its feeding movement.

10. In a meat-slitting machine, the combination with a conveyer for supporting meat to be slit, of means for moving said conveyer with a step-by-step motion to carry the meat supported thereon from station to station with a pause at each station, and means to make a series of slits in the meat extending continuously across the meat while it is at one of the stations and to make a second series of slits in the meat also extending continuously across the meat while it is at a subsequent station.

11. In a meat-slitting machine, the combination with a conveyer for supporting meat to be slit, of means for moving said conveyer with a step-by-step motion to carry the meat supported thereon from station to station with a pause at each station, and means to make a series of slits in the meat while it is at one of the stations and to make a second series of slits in the meat at an angle to the slits of the first series while the meat is at a subsequent station, the slits of each series extending continuously across the meat.

12. In a meat-slitting machine, the combination with a conveyer for supporting meat to be slit, of means for moving said conveyer with a step-by-step motion to carry the meat supported thereon from station to station with a period of rest at each station, a plurality of slitting knives situated above the conveyer, means to move the slitting knives across the meat in a direction at an angle to the line of feed and while the meat is at rest at one of said stations, whereby a plurality of continuous slits are made in the meat extending from one edge to the other of the latter at an angle to the direction of feed.

13. In a meat-slitting machine, the combination with a conveyer for supporting meat to be slit, of means for moving said conveyer with a step-by-step motion to carry the meat supported thereon from station to station with a period of rest at each station, a gang of slitting knives supported above the conveyer, and means to move the knives across the meat in a direction at an angle to the line of feed and while the meat is at rest at one station thereby to cut a series of slits in the meat extending at an angle to the line of feed, a second gang of slitting knives, and means to move said knives across the meat at an angle to both the line of feed and the direction of the slits made by the first-named gang, whereby a second series of slits are cut in the meat which cross those of the first series.

14. In a machine for slitting meat, the combination with means for feeding meat forward with a step-by-step movement, of means to make continuous straight slits in the meat which extend from one side to the other of said meat at an angle to the direction of feed while the meat is at rest between successive forward steps of the feeding movement.

15. In a meat-slitting machine, the combination with a conveyer for supporting meat to be slit, of means for moving said conveyer with a step-by-step motion to carry the meat supported thereon from station to station, means to make a series of slits in the meat while it is at rest at one of the stations, which slits extend continuously across the meat at an angle to the direction of feed, and means to make a second series of slits in said meat which also extend continuously across the meat at an angle to the line of feed and at an angle to the first-mentioned slits while said meat is at rest at another station.

16. In a meat-slitting machine, the combination with means for feeding meat forward, of means moving diagonally across the meat for making two series of parallel slits in the meat, the slits of each series extending continuously across the meat in a direction at an angle to the slits of the other series and also at an angle to the direction of feed.

17. In a meat-slitting machine, the combination with means for feeding meat forward, of means moving diagonally across the meat for making two series of parallel slits in the meat with the slits of each series extending continuously across the meat in a direction at an angle to the direction of feed, and also in a direction at an angle to the slits of the other series.

JOSEPH P. SPANG.